United States Patent [19]

Buschman et al.

[11] Patent Number: 4,479,142

[45] Date of Patent: Oct. 23, 1984

[54] INTERFACE APPARATUS AND METHOD FOR ASYNCHRONOUS ENCODING OF DIGITAL TELEVISION

[75] Inventors: Bob D. Buschman, Gaithersburg; Glenn D. Muth, Frederick; Ronald T. O'Connell, Germantown, all of Md.

[73] Assignee: M/A-COM DCC, Inc., Germantown, Md.

[21] Appl. No.: 379,382

[22] Filed: May 17, 1982

[51] Int. Cl.³ .................. H04N 9/32; H04N 9/42; H04N 7/08
[52] U.S. Cl. ........................ 358/13; 358/11; 358/142
[58] Field of Search .............. 358/320, 310, 141, 140, 358/13, 11, 143, 146

[56] References Cited

U.S. PATENT DOCUMENTS 4,122,477  10/1978  Gallo ............................... 358/13

Primary Examiner—John C. Martin
Assistant Examiner—Luan Nguyen
Attorney, Agent, or Firm—Pollock, Vande Sande & Priddy

[57] ABSTRACT

Digitally encoded (DPCM) NTSC video is transmitted in a standard T3 data format and rate via a transmit interface module. The module is subjected to inputs comprising DPCM encoded NTSC video, horizontal sync and a video sampling clock at $3f_{sc}$, where $f_{sc}$ is the color subcarrier frequency. The sampling clock is used to write the DPCM encoded video and horizontal sync into a buffer. The buffer is read out via a read clock which is a submultiple of the 44736 MHz T3 rate. To assist in receiver decoding, the video data is supplemented with horizontal sync indicating code words, which designate the start of each horizontal scan line. On detection of a horizontal sync word read out of the buffer memory, the read clock is inhibited for the insertion of the horizontal sync indicating code words. The T3 frame is also supplemented with two digitized audio channels, stuff indicators and a stuff opportunity slot as well as parity, frame and multiframe indicators and an alarm channel. The T3 frame also carries data indicating a relationship between the T3 clock and $f_{sc}$. This is useful at the receiver for ensuring that $f_{sc}$ at the receiver will track $f_{sc}$ at the transmitter. In accordance with standard T3 operation, the frame comprises 56 85-bit words, 28 odd and 28 even. The first bit of each 85-bit word is a control bit. Substantially all of the odd words include a 4-bit digitized audio nibble. Exceptions are two unused 4-bit nibbles, a single 4-bit stuff opportunity nibble and a single 4-bit video sample. Each of the even words includes 21 4-bit video samples which can be either video samples or sync indicating code words.

12 Claims, 10 Drawing Figures

| | | | | | | | | | | | | | | |
|---|---|---|---|---|---|---|---|---|---|---|---|---|---|---|
| X (841) | $F_1$ (841) | $C_{11}$ (841) | $F_0$ (841) | $C_{12}$ (841) | $F_0$ (841) | $C_{13}$ (841) | $F_1$ (841) | 1st FRAME |
| X (841) | $F_1$ (841) | $C_{21}$ (841) | $F_0$ (841) | $C_{22}$ (841) | $F_0$ (841) | $C_{23}$ (841) | $F_1$ (841) | 2nd FRAME |
| P (841) | $F_1$ (841) | $C_{31}$ (841) | $F_0$ (841) | $C_{32}$ (841) | $F_0$ (841) | $C_{33}$ (841) | $F_1$ (841) | 3rd FRAME |
| P (841) | $F_1$ (841) | $C_{41}$ (841) | $F_0$ (841) | $C_{42}$ (841) | $F_0$ (841) | $C_{43}$ (841) | $F_1$ (841) | 4th FRAME |
| $M_0$ (841) | $F_1$ (841) | $C_{51}$ (841) | $F_0$ (841) | $C_{52}$ (841) | $F_0$ (841) | $C_{53}$ (841) | $F_1$ (841) | 5th FRAME |
| $M_1$ (841) | $F_1$ (841) | $C_{61}$ (841) | $F_0$ (841) | $C_{62}$ (841) | $F_0$ (841) | $C_{63}$ (841) | $F_1$ (841) | 6th FRAME |
| $M_0$ (841) | $F_1$ (841) | $C_{71}$ (841) | $F_0$ (841) | $C_{72}$ (841) | $F_0$ (841) | $C_{73}$ (841) | $F_1$ (841) | 7th FRAME |

FIG. 1  PRIOR ART

| | | | | | | | | |
|---|---|---|---|---|---|---|---|---|
| X | $A_{1A}$ | $A_{1B}$ | $A_{1C}$ | $A_{1D}$ | $[20(V_1\ V_2\ V_3\ V_4)]$ | $F_1$ | $[21(V_1\ V_2\ V_3\ V_4)]$ | ⎫ |
| $C_{11}$ | $A_{1E}$ | $A_{1F}$ | $A_{1G}$ | $A_{1H}$ | $[20(V_1\ V_2\ V_3\ V_4)]$ | $F_0$ | $[21(V_1\ V_2\ V_3\ V_4)]$ | ⎬ THE 1st FRAME |
| $C_{12}$ | $A_{1I}$ | $A_{1J}$ | $A_{1K}$ | $A_{1L}$ | $[20(V_1\ V_2\ V_3\ V_4)]$ | $F_0$ | $[21(V_1\ V_2\ V_3\ V_4)]$ | |
| $C_{13}$ | $A_{2A}$ | $A_{2B}$ | $A_{2C}$ | $A_{2D}$ | $[20(V_1\ V_2\ V_3\ V_4)]$ | $F_1$ | $[21(V_1\ V_2\ V_3\ V_4)]$ | ⎭ |
| X | $A_{2E}$ | $A_{2F}$ | $A_{2G}$ | $A_{2H}$ | $[20(V_1\ V_2\ V_3\ V_4)]$ | $F_1$ | $[21(V_1\ V_2\ V_3\ V_4)]$ | ⎫ |
| $C_{21}$ | $A_{2I}$ | $A_{2J}$ | $A_{2K}$ | $A_{2L}$ | $[20(V_1\ V_2\ V_3\ V_4)]$ | $F_0$ | $[21(V_1\ V_2\ V_3\ V_4)]$ | ⎬ THE 2nd FRAME |
| $C_{22}$ | $N_1$ | $N_2$ | $N_3$ | $N_4$ | $[20(V_1\ V_2\ V_3\ V_4)]$ | $F_0$ | $[21(V_1\ V_2\ V_3\ V_4)]$ | |
| $C_{23}$ | $A_{1A}$ | $A_{1B}$ | $A_{1C}$ | $A_{1D}$ | $[20(V_1\ V_2\ V_3\ V_4)]$ | $F_1$ | $[21(V_1\ V_2\ V_3\ V_4)]$ | ⎭ |
| P | $A_{1E}$ | $A_{1F}$ | $A_{1G}$ | $A_{1H}$ | $[20(V_1\ V_2\ V_3\ V_4)]$ | $F_1$ | $[21(V_1\ V_2\ V_3\ V_4)]$ | ⎫ |
| $C_{31}$ | $A_{1I}$ | $A_{1J}$ | $A_{1K}$ | $A_{1L}$ | $[20(V_1\ V_2\ V_3\ V_4)]$ | $F_0$ | $[21(V_1\ V_2\ V_3\ V_4)]$ | ⎬ THE 3rd FRAME |
| $C_{32}$ | $A_{2A}$ | $A_{2B}$ | $A_{2C}$ | $A_{2D}$ | $[20(V_1\ V_2\ V_3\ V_4)]$ | $F_0$ | $[21(V_1\ V_2\ V_3\ V_4)]$ | |
| $C_{33}$ | $A_{2E}$ | $A_{2F}$ | $A_{2G}$ | $A_{2H}$ | $[20(V_1\ V_2\ V_3\ V_4)]$ | $F_1$ | $[21(V_1\ V_2\ V_3\ V_4)]$ | ⎭ |
| P | $A_{2I}$ | $A_{2J}$ | $A_{2K}$ | $A_{2L}$ | $[20(V_1\ V_2\ V_3\ V_4)]$ | $F_1$ | $[21(V_1\ V_2\ V_3\ V_4)]$ | ⎫ |
| $C_{41}$ | $S_1$ | $S_2$ | $S_3$ | $S_4$ | $[20(V_1\ V_2\ V_3\ V_4)]$ | $F_0$ | $[21(V_1\ V_2\ V_3\ V_4)]$ | ⎬ THE 4th FRAME |
| $C_{42}$ | $A_{1A}$ | $A_{1B}$ | $A_{1C}$ | $A_{1D}$ | $[20(V_1\ V_2\ V_3\ V_4)]$ | $F_0$ | $[21(V_1\ V_2\ V_3\ V_4)]$ | |
| $C_{43}$ | $A_{1E}$ | $A_{1F}$ | $A_{1G}$ | $A_{1H}$ | $[20(V_1\ V_2\ V_3\ V_4)]$ | $F_1$ | $[21(V_1\ V_2\ V_3\ V_4)]$ | ⎭ |
| $M_0$ | $A_{1I}$ | $A_{1J}$ | $A_{1K}$ | $A_{1L}$ | $[20(V_1\ V_2\ V_3\ V_4)]$ | $F_1$ | $[21(V_1\ V_2\ V_3\ V_4)]$ | ⎫ |
| $C_{51}$ | $A_{2A}$ | $A_{2B}$ | $A_{2C}$ | $A_{2D}$ | $[20(V_1\ V_2\ V_3\ V_4)]$ | $F_0$ | $[21(V_1\ V_2\ V_3\ V_4)]$ | ⎬ THE 5th FRAME |
| $C_{52}$ | $A_{2E}$ | $A_{2F}$ | $A_{2G}$ | $A_{2H}$ | $[20(V_1\ V_2\ V_3\ V_4)]$ | $F_0$ | $[21(V_1\ V_2\ V_3\ V_4)]$ | |
| $C_{53}$ | $A_{2I}$ | $A_{2J}$ | $A_{2K}$ | $A_{2L}$ | $[20(V_1\ V_2\ V_3\ V_4)]$ | $F_1$ | $[21(V_1\ V_2\ V_3\ V_4)]$ | ⎭ |
| $M_1$ | $U_1$ | $U_2$ | $U_3$ | $U_4$ | $[20(V_1\ V_2\ V_3\ V_4)]$ | $F_1$ | $[21(V_1\ V_2\ V_3\ V_4)]$ | ⎫ |
| $C_{61}$ | $A_{1A}$ | $A_{1B}$ | $A_{1C}$ | $A_{1D}$ | $[20(V_1\ V_2\ V_3\ V_4)]$ | $F_0$ | $[21(V_1\ V_2\ V_3\ V_4)]$ | ⎬ THE 6th FRAME |
| $C_{62}$ | $A_{1E}$ | $A_{1F}$ | $A_{1G}$ | $A_{1H}$ | $[20(V_1\ V_2\ V_3\ V_4)]$ | $F_0$ | $[21(V_1\ V_2\ V_3\ V_4)]$ | |
| $C_{63}$ | $A_{1I}$ | $A_{1J}$ | $A_{1K}$ | $A_{1L}$ | $[20(V_1\ V_2\ V_3\ V_4)]$ | $F_1$ | $[21(V_1\ V_2\ V_3\ V_4)]$ | ⎭ |
| $M_0$ | $A_{2A}$ | $A_{2B}$ | $A_{2C}$ | $A_{2D}$ | $[20(V_1\ V_2\ V_3\ V_4)]$ | $F_1$ | $[21(V_1\ V_2\ V_3\ V_4)]$ | ⎫ |
| $C_{71}$ | $A_{2E}$ | $A_{2F}$ | $A_{2G}$ | $A_{2H}$ | $[20(V_1\ V_2\ V_3\ V_4)]$ | $F_0$ | $[21(V_1\ V_2\ V_3\ V_4)]$ | ⎬ THE 7th FRAME |
| $C_{72}$ | $A_{2I}$ | $A_{2J}$ | $A_{2K}$ | $A_{2L}$ | $[20(V_1\ V_2\ V_3\ V_4)]$ | $F_0$ | $[21(V_1\ V_2\ V_3\ V_4)]$ | |
| $C_{73}$ | $U_1$ | $U_2$ | $U_3$ | $U_4$ | $[20(V_1\ V_2\ V_3\ V_4)]$ | $F_1$ | $[21(V_1\ V_2\ V_3\ V_4)]$ | ⎭ |

FIG. 2

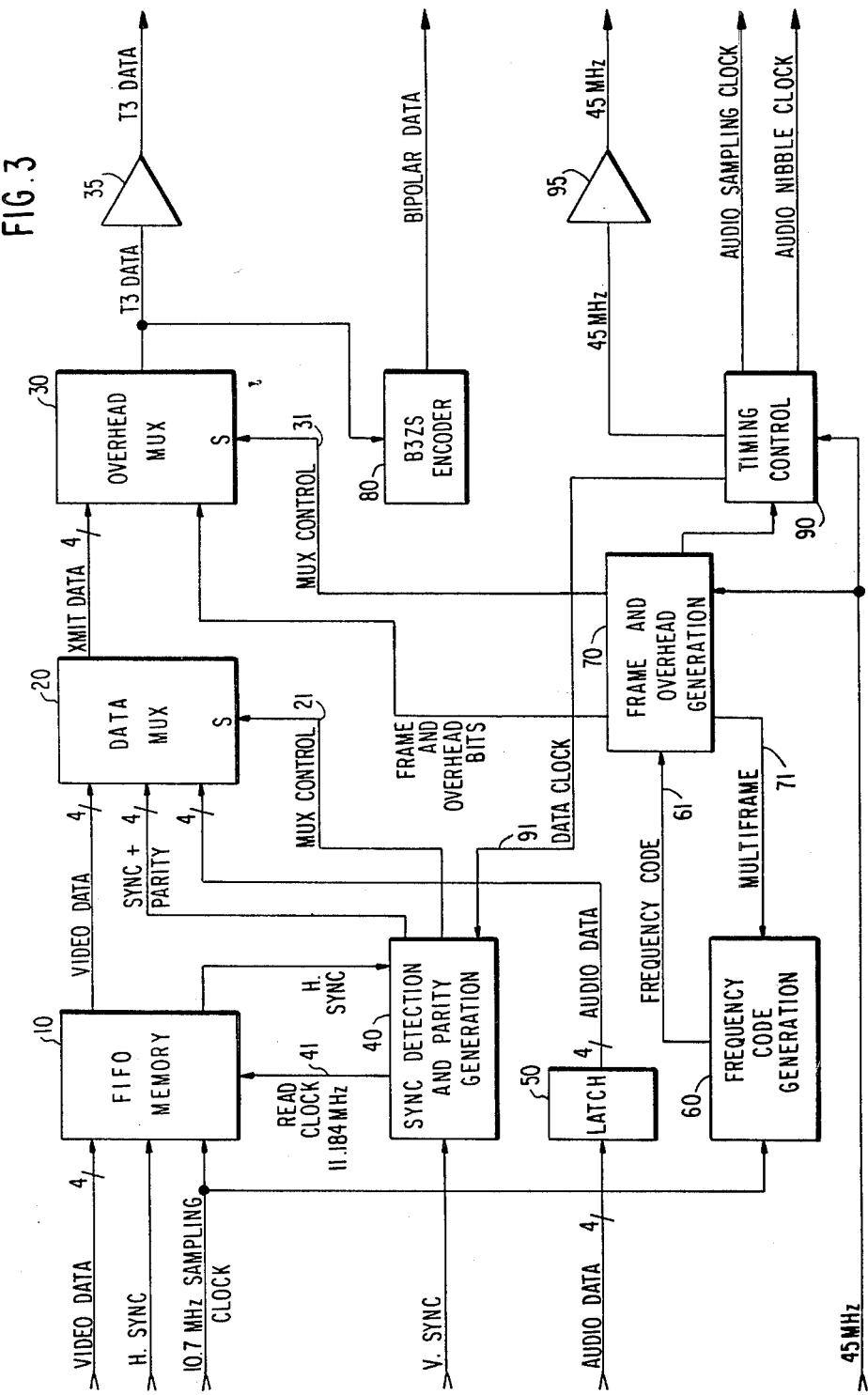

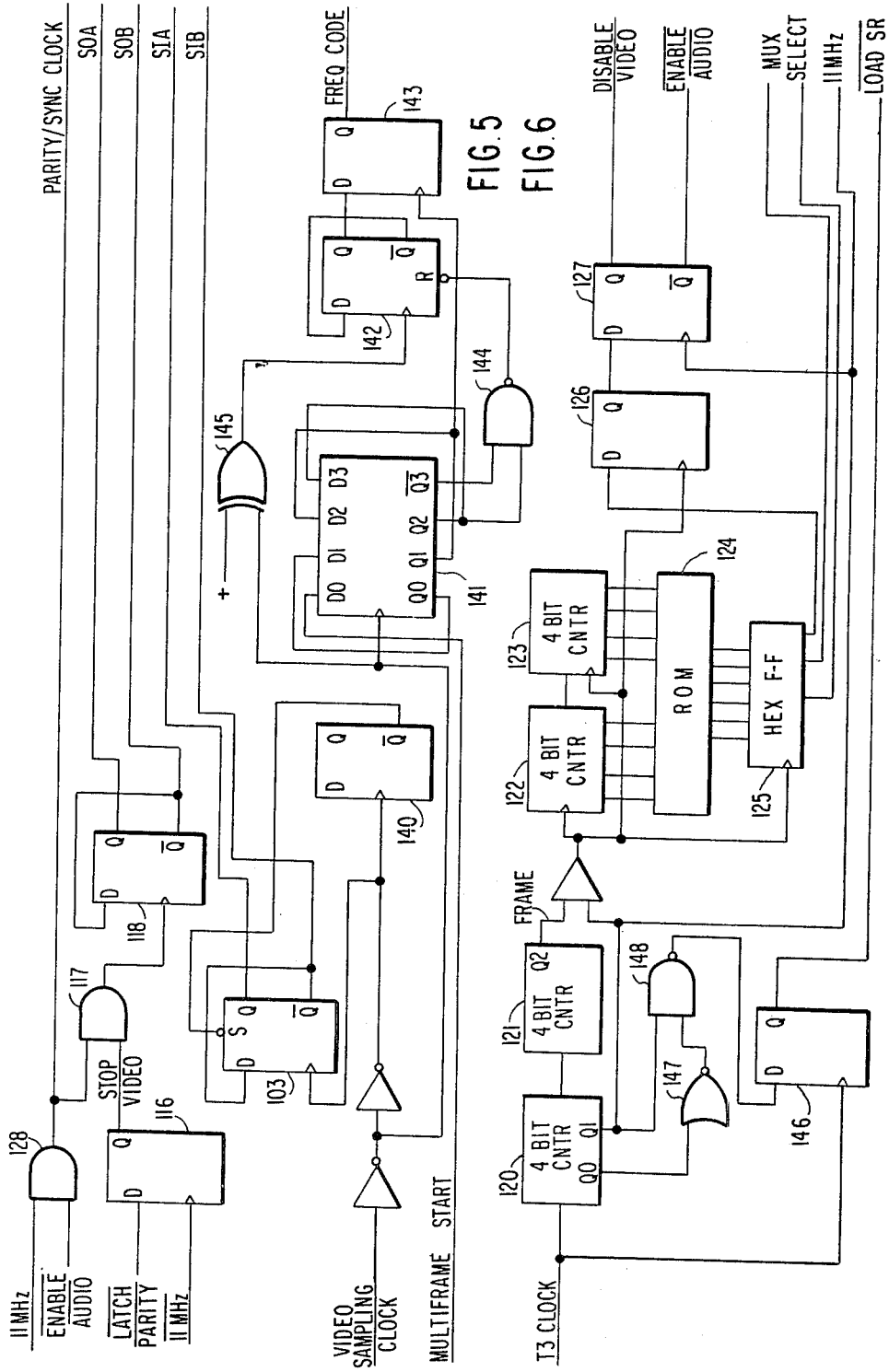

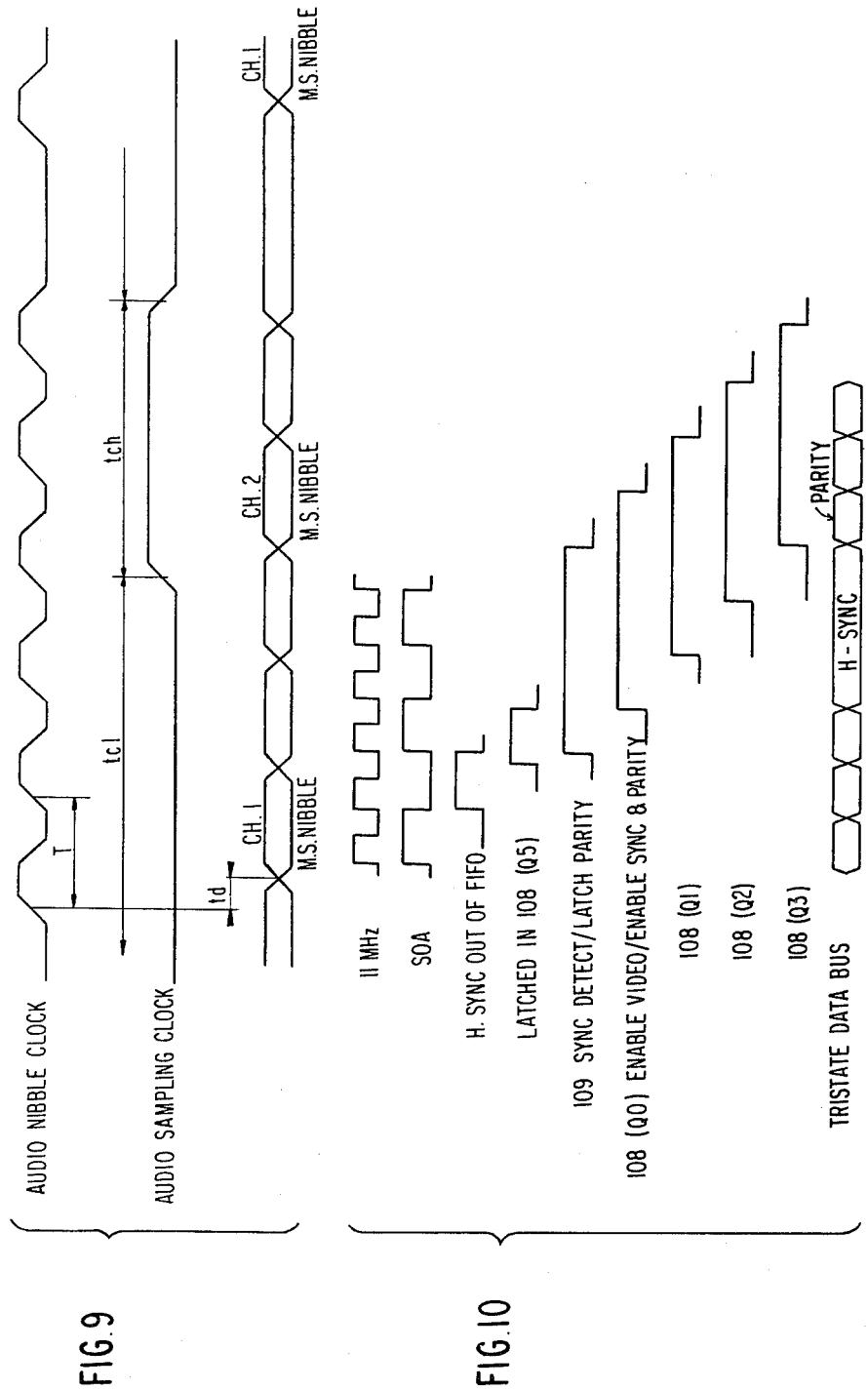

INTERFACE APPARATUS AND METHOD FOR ASYNCHRONOUS ENCODING OF DIGITAL TELEVISION

TECHNICAL FIELD

The present invention relates to the digital transmission of color television signals, especially transmission of digitized NTSC at the standard T3 rate and format.

BACKGROUND ART

The field of digital television transmission, especially that transmission employing bandwidth compression techniques is summarized in "Digital Television Transmission Using Bandwidth Compression Techniques" by Kneko et al. in the *IEEE Communications Magazine* for July, 1980 at pages 14–22; and in "Digital Encoding of Color Video Signals—A Review" by Limb et al. appearing in the *IEEE Transactions on Communications*, Vol. COM-25, No. 11, November 1977 at pages 1349–1385. Unencoded digitized NTSC signals produce an approximately 86 Mbps bit stream. It has long been recognized that bandwidth compression techniques (for example DPCM) can be used to reduce that relatively high rate. For example, Ishiguro, in U.S. Pat. No. 3,843,940 discloses a "Differential Pulse Code Modulation Transmission System" for NTSC, SECAM or PAL video signals. Other examples of bandwidth compression techniques for color television are found in "Interframe Coding for 4 MHz Color Television Signals" by Iinuma et al. appearing in the *IEEE Transactions on Communications*, Vol. COM-23, No. 12, December 1975 at pages 1461 et seq; "1.544 Megabits per Second Transmission of TV Signals by Interframe Coding System" by Yasuda et al. appearing in the *IEEE Transactions on Communications*, Vol. COM-24, October 1976 at pages 1175 et seq; "A 32 Megabit per Second Component Separation DPCM Coding System for NTSC Color TV" by Swada et al. appearing in the *IEEE Transactions on Communications*, Vol. COM-26, No. 4 for April 1978 at pages 458 et seq and "32 Megabit per Second Transmission of NTSC Color TV Signals by Composite DPCM Coding" by Sawada et al. appearing in the *IEEE Transactions on Communications*, Vol. COM-26, No. 10 for October 1978, pages 1432 et seq.

The extent to which bandwidth compression is applied and hence the ultimate data rate of the coded video depends on constraints such as desired picture quality, cost and complexity of equipment and expected mode of transmission. While captive systems have been proposed at bit rates in the range of 1.5–32 megabits per second, it is generally expected that cable and/or network quality television signals will require higher data rates especially if intraframe, and not interframe, coding is used.

For applications of digital transmission techniques to existing video systems, one is constrained by the fact that the video signal is necessarily asynchronous to the transmission clock. Even in the general case, however, since the digital transmission is but an adjunct to the generation and use of the video signals, it should not be expected that the transmission system clock rate can be imposed on the video signal generation and thus, even in general, one should expect that the video signal will be asynchronous to the transmission rate clock.

There are, at the present time, substantial quantities of digital transmission equipment which adhere to common carrier standards. There is for example a T1 standard at 1.544 megabits per second, a T2 standard at 6.13 megabits per second and a T3 standard at 44.736 megabits per second.

Prior art suggestions for transmitting digitized video tie the transmission rate and format to the video line rate, see in this regard the Sawada et al. publication cited above, particularly Vol. COM-26, No. 4, page 462, wherein for transmission purposes, two different frames are defined, a first frame type is exactly equal to two adjacent horizontal line signals and a second frame type is exactly equal to a single line signal. See also Vol. COM-26, No. 10, page 1435.

This technique, while having an appearance of simplifying equipment, actually imposes unnecessary burdens on the transmission equipment. If, for example, standard data rate and format were used to encode the digital television, existing transmission monitoring equipment could be used to monitor the error rate of the data using parity bits provided for in the standard frame format. This practical consideration saves the cost of additional overhead in the transmitted data to perform the monitoring function, thus reducing the overall data rate required.

It is therefore an object of the present invention to provide a method and apparatus for transmitting digitized NTSC signals via standard transmission equipment using standard frame format and rate.

Since the video is DPCM encoded, the receiver requires a decoder to recreate the original video. This decoder can be simplified if it can recognize each video line start. Since the video timing is asynchronous to the T3 clock, we cannot use the transmission clock to identify video lines, as could be the case with the Swada proposals referenced above. Accordingly, we insert into the video stream digital codes uniquely identifying each video line start. Accordingly, it is another object of the invention to provide a method and apparatus for transmitting digitized video which has the capability of inserting code words uniquely identifying each video line start.

To further assist in properly receiving the encoded digitized video, the transmission includes information relating the color subcarrier (or video sampling clock) to the T3 clock. Since the T3 clock is available at both transmitter and receiver, this data can be used to meter the color subcarrier at the receiver to ensure it tracks the color subcarrier at the transmitter.

SUMMARY OF THE INVENTION

To achieve the foregoing, and other advantages of the invention, the standard T3 format is employed. This standard format provides for 56 85-bit words per multiframe, with 7 frames per multiframe. Accordingly, each frame includes 8 85-bit words. Each of these 85-bit words consists of 1 control bit and 84 (nominally) data bits. While in the standard T3 format these 84 bits are truly data, in the invention some are used for other purposes, hence they are referred to as only nominally data. Considering a multiframe, then, we can locate 28 odd and 28 even 84-bit "data" words. In accordance with the invention, each of the odd 84-bit data words includes a first 4-bit nibble which is used substantially only for transmission of digitized audio. Exceptions are two unused 4-bit nibbles, a single 4-bit stuff opportunity and a single 4-bit digitized video nibble per multiframe.

In addition, to simplify the decoding process at a receiver, the method and apparatus of the invention provides for the transmission of supplemental data in the form of a plurality of 4-bit nibbles. This supplemental data actually consists of 3 4-bit nibbles (or a 12-bit code word) signalling the start of each video horizontal scan line. Because the frame duration is fixed (by the T3 standard) that duration is not rationally related to the line rate or scan line duration. However, with the format described above, at least one of every pair of frames includes the code word mentioned above. For those frames which do not include this code word, encoded video is transmitted in its place.

To provide for the generation of the standard T3 rate and format, the apparatus of the invention provides a buffer which operates as a first in, first out memory. The buffer is subjected to four significant input signals, DPCM encoded video samples (since the digitized video is differential encoded, the samples are sometimes referred to as differences or video differences), horizontal sync and a sampling clock, the latter at an integer multiple of the color subcarrier, e.g. 10.7 MHz. This clock is used to write the buffer, and the buffer is read by a read clock which is nominally an integer (4) submultiple of the T3 44.736 MHz rate or 11.184 MHz. Although the read clock is exactly at this rate, the read operation is only nominally performed at this rate because, associated with the buffer is a sync detector which produces a sync detection signal, on reading a horizontal sync signal from the buffer which has the effect of inhibiting the read clock. This allows a supplemental data generator to generate and output the horizontal sync indicating code for insertion in the data stream during the time that the read clock is inhibited. After termination of the read clock inhibition, reading of the buffer continues. The read clock is generated by a timing circuit control which is subjected to a T3 rate clock input. The DPCM encoded video is output from the buffer to a data multiplexer, another input to the data multiplexer is the supplemental data signal from the supplemental data generator.

Accordingly, in one aspect, the invention provides for an interface for a video encoder arranged to output asynchronously encoded video and supplemental data in a T3 data format and rate for interfacing with encoded video, sampled at an integer multiple of $f_{sc}$, where $f_{sc}$ is the color subcarrier frequency comprising:

a buffer with DPCM encoded video and video sync inputs, and an output, means to write video and video sync into said buffer in response to a sampling clock, timing circuit control means responsive to a T3 rate clock for producing a data read clock at a submultiple of said T3 rate clock, coupling means for coupling said data read clock to said buffer for reading out said buffer at said data read clock rate to produce a data stream, sync detection means responsive to a sync signal read from said buffer for inhibiting said coupling means for a predetermined time, supplemental data generator means with an output coupled to a data multiplexing means for generating supplemental data, data multiplexing means responsive to video data read from said buffer and to supplemental data from said supplemental data generator means for outputting said video data and supplemental data in time sequence, whereby detection of a sync signal inhibits reading of said buffer for said predetermined time allowing insertion of said supplemental data.

The standard T3 data rate and format constrains the availability of DPCM encoded video data which can be transmitted, and the asynchronous nature of the video sync and T3 data rate is a further complicating factor especially when it is desired to add horizontal line scan synchronous supplemental data which is therefore asynchronous with the frame rate. The T3 rate provides for 56 85-bit words wherein a first bit is control data and 84 bits are nominally data bits. The 56 words can be thought of as 28 odd and 28 even words. Of the 28 odd 84-bit data words, a 4-bit nibble of each is used for substantially only digitized audio. These 4-bit nibbles provide for two channels of digitized audio. Two of the 28 4-bit nibbles are unused (occupied by non-information bearing pulses), a single 4-bit nibble is used as a single stuff opportunity per frame, and another 4-bit nibble is used for encoded video. The remaining 84 data bits in each of the even words and the remaining 80 data bits in the odd words are used for encoded video with one exception. The supplemental data, in an embodiment of the invention, consists of three 4-bit nibbles representing horizontal line scan start, and a 4-bit parity nibble. Because of the asynchronous relation between the period between horizontal line scans and the T3 frame rate, the supplemental data does not appear in each frame. Rather, the supplemental data appears in at least one of each pair of frames, and in some instances occurs in both frames of a pair.

Therefore, in accordance with another aspect, the invention provides a method of transmitting DPCM encoded NTSC video in a T3 format comprising the steps of:

assembling a serial digital bit stream into sequential T3 frames, repeating at a T3 frame rate, said serial digital bit stream consisting of a sequence of 56 85-bit digital words, 28 odd and 28 even words, each such word including a single control bit and 84 data bits, a majority of said 84 data bits comprising encoded video, each such odd digital word including a single 4-bit nibble of substantially only digitized audio data, said digital bit stream associated with at least every other frame including a plurality of 4-bit nibbles signalling a video scan line start.

The multi-frame also includes provision for a frequency code which relates video sampling clock (directly tied to the color subcarrier) and the T3 clock. Actually, one is divided by the other and a single bit of the remainder is transmitted. At the receiver, this bit can be used to meter the generation of the color subcarrier to maintain the color subcarrier at receiver and transmitter in alignment relative to the T3 clock. More particularly, each multi-frame, a delay (four-stage counter) is pulsed, and the counter is clocked by the video sampling clock. At the same time, a one bit counter is clocked by the video sampling clock. The one bit counter is reset a fixed number of video sampling clocks after multi-frame start. A latch is enabled to latch the state of the one bit counter a fixed number of video sampling clocks after multi-frame start. The condition of this latch is the frequency code. It should be apparent that over many multi-frames, a sequence formed by a sequence of the single bit frequency code will indicate the relation between the multi-frame start period (tied to the T3 clock) and the video sampling clock period (tied to color subcarrier). Thus, in another aspect, the invention provides an interface for a video encoder arranged to output asynchronously encoded video and supplemental data in a T3 data format and rate for interfacing with DPCM encoded video sampled at an integer multiple of a color subcarrier comprising:

means for inserting DPCM encoded video into a T3 frame, first means for comparing a video sampling clock directly related to said color subcarrier and a T3 signal directly related to said T3 rate, and wherein said means for inserting includes, means responsive to said first means for inserting data representative of said comparison into said T3 frame.

BRIEF DESCRIPTION OF THE DRAWINGS

The present invention will now be described in further detail in the following portions of this specification when taken in conjunction with the attached drawings in which like reference characters identify identical apparatus and in which:

FIG. 1 illustrates the format of the prior art T3 frame structure;

FIG. 2 illustrates the format of the frame as employed in accordance with the invention to transmit NTSC DPCM encoded video and auxiliary information;

FIG. 3 is a block diagram of the interface which accepts DPCM encoded video, horizontal and vertical sync, a sampling clock and audio data and produces the formatted data;

FIGS. 4–7 are detailed block diagrams illustrating the sync detection and parity generation circuit 40, audio data latch 50 and timing control 90;

FIG. 9 is a timing diagram illustrating the timing relationship between the audio nibble clock, the audio sampling clock and representative audio data; and FIG. 10 is a timing diagram illustrating the response to detection of horizontal sync, and the insertion of the horizontal sync and parity code words onto the tristate data bus.

DETAILED DESCRIPTION OF THE PREFERRED EMBODIMENTS

Figure 4:
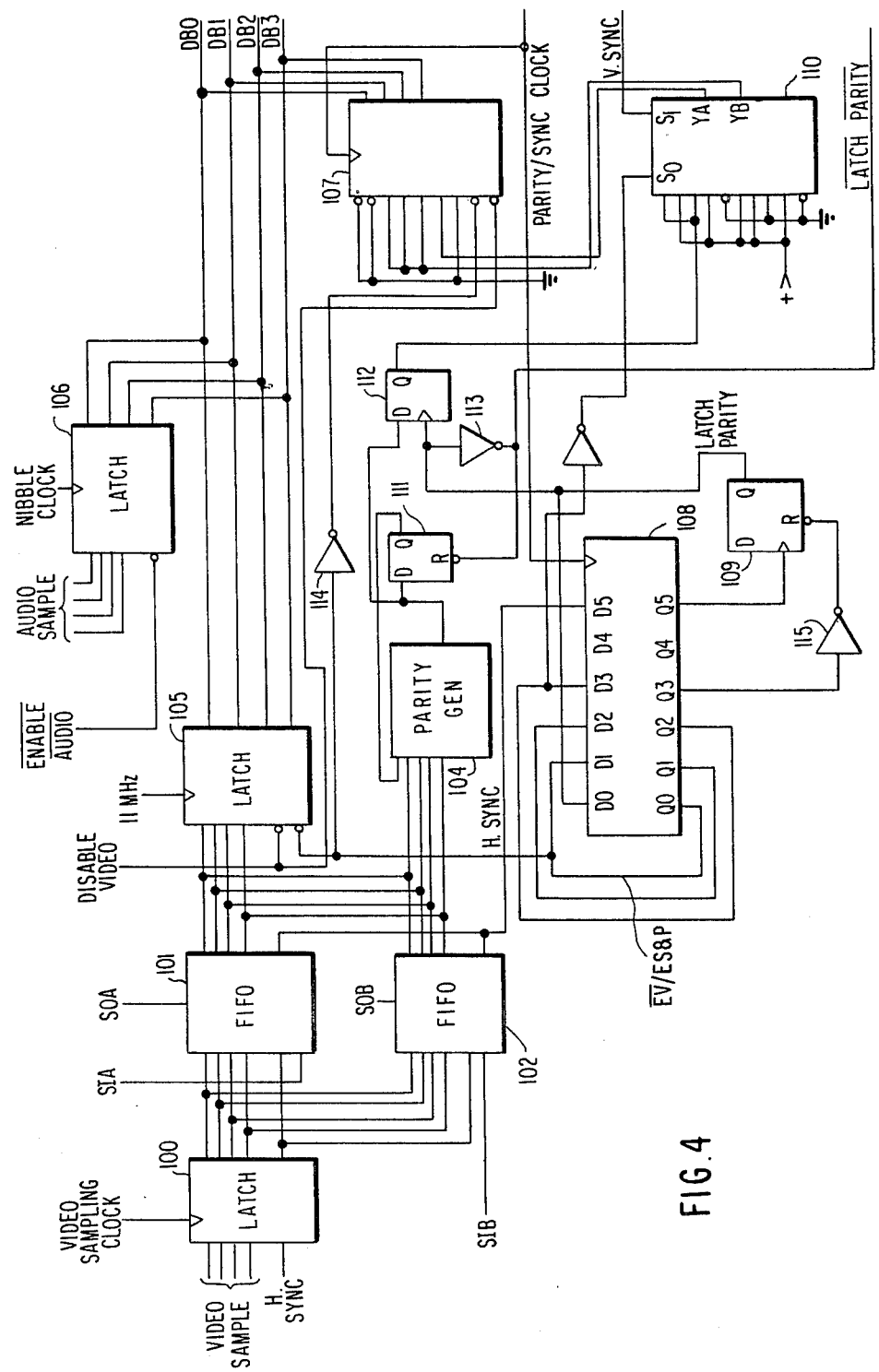
Figure 7:
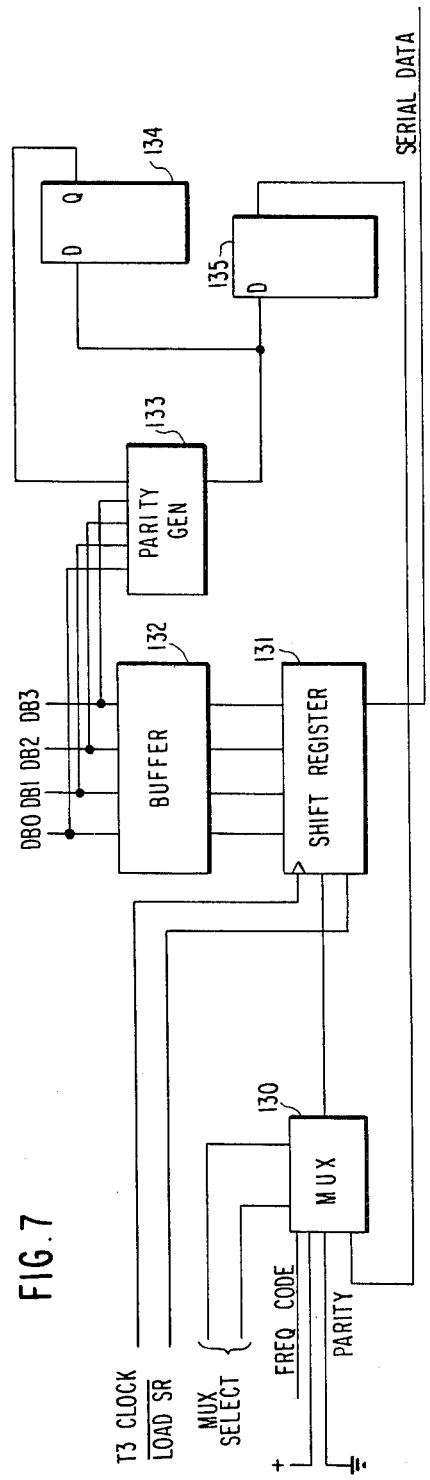

FIG. 1 illustrates the standard T3 format. FIG. 1 is organized on seven lines, thus each line represents a different frame, the seven lines shown in FIG. 1 represent a single seven-frame multiframe. Those skilled in the art will be aware that this illustration is for convenience, in practice the entire frame is a serial time sequence. In accordance with the representation in FIG. 1, X represents an alarm service channel wherein in any multiframe the two X bits are identical. The P bits are parity information for parity taken over all information time slots in the preceding multiframe; conventionally, both P bits are identical. The M bits are multiframe alignment signals appearing, as shown in the fifth, sixth and seventh frames. Conventionally $M_0$ and $M_1$ are 0 and 1, respectively. The F bits are frame bits, which appear in a sequence as shown in FIG. 1 wherein $F_0$ and $F_1$ are 0 and 1, respectively. Each frame provides for stuffing indicator bits $C_{xy}$, where x identifies a frame and y is an integer in the range of 1–3. In any one frame, only one of two stuffing indicator words are allowed, either 000 or 111. The stuff time slot is the first data slot following $F_1$ after $C_{i3}$ in the ith frame. Finally, the representation 84I represents 84 data bits.

Accordingly, FIG. 1 can be said to represent a multiframe consisting of 56 85-bit digital words with each 85-bit digital word consisting of a single control bit and 84 data bits.

The particularized frame produced by the apparatus, and used in the method, of the present invention is shown in FIG. 2. In FIG. 2, for convenience, each different frame is shown on four lines, those skilled in the art will of course understand that each frame is actually a time sequence which begins at the upper left, proceeds horizontally across to the end of the line, then drops down to the next line and begins at the left, and so forth. Accordingly, FIG. 2 also shows the seven different frames of each multiframe. However, in order to show the particular use for each of the significant bit positions, the illustration in FIG. 2 is somewhat expanded relative to that of FIG. 1. In FIG. 2, the X, P, $M_0$, $M_1$, $F_0$ and $F_1$ positions have the same meaning as in FIG. 1.

Referring now to the first 85-bit word, FIG. 2 indicates that it includes the X bit, a 4-bit audio nibble comprising bits $A_{1A}$ through $A_{1D}$, and 80 bits consisting of 20 4-bit video samples (each sample including bits $V_1$–$V_4$). In contrast, the second 85-bit word includes a frame alignment bit $F_1$ and 21 4-bit video samples. It should be apparent from the format of FIG. 2 that every even word, that is the 28 85-bit words numbered 2–56 include 21 4-bit video samples and the first (control) bit is either $F_1$ or $F_0$. In contrast, the 28 odd 85-bit words each include 20 4-bit video samples, but for the most part the first 4-bit nibble is not a video sample. The bit positions $A_{1x}$ and $A_{2x}$ (where x is an alphabetic character from A–L, inclusive) represents two different audio channels. The 4-bit nibbles represented by the U bit positions are unused, the 4-bit nibble represented by the S bit positions are a single stuff opportunity per multiframe. The stuffing indicator bits are represented by some of the C bit positions, but in contrast to FIG. 1 which shows seven stuff opportunities, one for each frame, in FIG. 2 there is only one stuff opportunity per multiframe. The 4-bit nibble represented by the N bit positions is a further video sample. The unused bit positions carry time-consuming pulses, but do not represent meaningful information and are not employed, other than marking time, in the decoding process.

As shown in FIG. 2, there are 1148 4-bit video samples in each multiframe.

Once per horizontal line scan start, three 4-bit nibbles of the 1148 4-bit nibbles in a multiframe used for video samples, carry a digital code indicating the beginning of the horizontal line scan. Associated with these three 4-bit nibbles is a fourth, 4-bit nibble containing parity information and an indication of the presence or absence of vertical sync. Accordingly, a total of 16 bits (or 4 4-bit nibbles) is devoted to a predetermined code word indicating beginning of horizontal line scan. Because the T3 frame rate and the horizontal line scan rate are asynchronous, there is no rational relation between the rate of horizontal line scan start and any T3 related rate. However, this code word is inserted into at least one of every pair of multiframes, and in some cases, both multiframes of a pair.

As was mentioned above, the 4-bit nibble identified by the S bit positions is used for stuffing, if needed. The stuffing indicator word corresponds to the bit positions $C_{xy}$ (where x is 1–3 and y is 1–3). In any one multiframe, either all these bits are one, indicating the presence of stuffing, or all are zero, indicating the absence of stuffing. The bit positions identified by $C_{xy}$ (where x is 4 or 5 and y is 1–3, inclusive) are not used. The bit positions identified by $C_{xy}$ (where x is 6 or 7 and y is 1–3, inclusive) is a single bit frequency indicator appearing in six different locations in the multiframe. The frequency indicator indicates the measured value of $f_{sc}$ at the encoder (relative to the T3 rate) so the decoder can properly track and recreate the NTSC waveform.

The apparatus to transmit the encoded video and auxiliary information in the T3 format is shown in FIG. 3.

As shown in FIG. 3, the 4-bit video samples which have been DPCM encoded via apparatus not shown, is input to one terminal of a FIFO 10 on a 4-bit wide basis. A second input to the FIFO 10 is a horizontal sync signal. Both inputs to the FIFO 10 are written with the aid of a sampling clock which is related to the color subcarrier frequency $f_{sc}$. In a particular embodiment of the invention, a sampling clock is three times this subcarrier, i.e. typically 10.7 Mhz. The data path taken by the video samples proceeds from an output of the FIFO 10 to one input of a multiplexer 20. Under control of a multiplexer control signal 21 from a sync detection and parity generation circuit 40, the multiplexer 20 accepts the 4-bit video samples, 4-bit sync and parity code words from the sync detection and parity generator 40 or 4-bit audio samples from a latch 50. The data multiplexer 20 produces a 4-bit wide XMIT data output, which is itself input to an overhead multiplexer 30. The other input to the overhead multiplexer 30 is frame and overhead bits from a frame and overhead generation circuit 70. The overhead multiplexer 30 accepts one or the other of its inputs in response to a multiplexer control signal 31 also derived from the frame and overhead generation circuit 70. The output of the multiplexer 30 is a serial stream at the T3 rate and in the T3 format which may, for example, be coupled through an amplifier 35 and output. In addition, in an embodiment of the invention, a B3ZS encoder 80 accepts the T3 data and produces at an output bipolar T3 data for transmission purposes.

The clock for reading the FIFO 10 is initially derived from a T3 clock which is input to a timing and control circuit 90. The timing and control circuit 90 produces an audio sampling clock and an audio nibble clock, both related to the T3 rate. These are used in the audio sampling equipment (not shown) which produces the audio data input to latch 50. Accordingly, the audio data is synchronous with the T3 clock. In addition, the timing and control circuit 90 produces a data clock 91, at ¼ the T3 rate, or 11.184 MHz. This data clock 91 is input to the sync detection and parity generation circuit 40 which, in response thereto, couples a read clock 41 at 11.184 MHz to the FIFO 10.

The T3 rate clock is also input to the frame and overhead generation circuit 70. This allows the production of the overhead multiplexer control signal 31 as well as the frame and overhead bits which provide one input to the overhead multiplexer 30. The frame and overhead generation circuit 70 also produces a multiframe signal 71 which is input to a frequency code generation circuit 60. The other input to the frequency code generation circuit is the sampling clock used to write the FIFO 10. The frequency code generation circuit 60 compares the periods of its two input signals. An output of the frequency code generation circuit 60 is a digital frequency code 61 which is input to the frame and overhead generation circuit 70 where it is used as a frequency indicator indicative of the frequency ($f_{sc}$), representing the sampling clock rate, and therefore the write clock rate for FIFO 10.

In response to the audio sampling clock and audio nibble clock, produced by the timing and control circuit 90, audio data samples are coupled as an input to the latch 50. At specified times in the frame, as represented in the format shown in FIG. 2, this audio data is accepted by the data multiplexer 20 for insertion into the serial 4-bit wide stream XMIT data.

The sync detection and parity generation circuit 40 produces the data multiplexer control signal 21 and a sync and parity code word as referred to above. It receives the data clock 91 from the timing and control circuit 90 and from that fashions the read clock 41 to read the FIFO 10. The sync detection and parity generation circuit 40 is also responsive to a vertical sync signal from the video output as well as an indication that the FIFO 10 has read a horizontal sync signal. In response to the horizontal sync, the sync detection and parity generation circuit 40 interrupts the read clock 41 and provides the sync and parity code words to the data multiplexer 20 for insertion in the frame as shown in FIG. 2. Depending on random relative timing between the T3 clock and the video scan line start, the sync and parity words can be inserted into any video nibble. At the conclusion of generating the necessary sync and parity bits, the read clock 41 is again enabled to continue reading FIFO 10.

Accordingly, as shown in FIG. 2, the T3 frame is composed of a time sequence of frame and other control bits dictated by the T3 format, video samples in the position specified in FIG. 2, a specified plurality of 4-bit nibbles representing the beginning of each horizontal line scan and the frequency code indicator produced by the frequency code generator 60.

Figure 8:
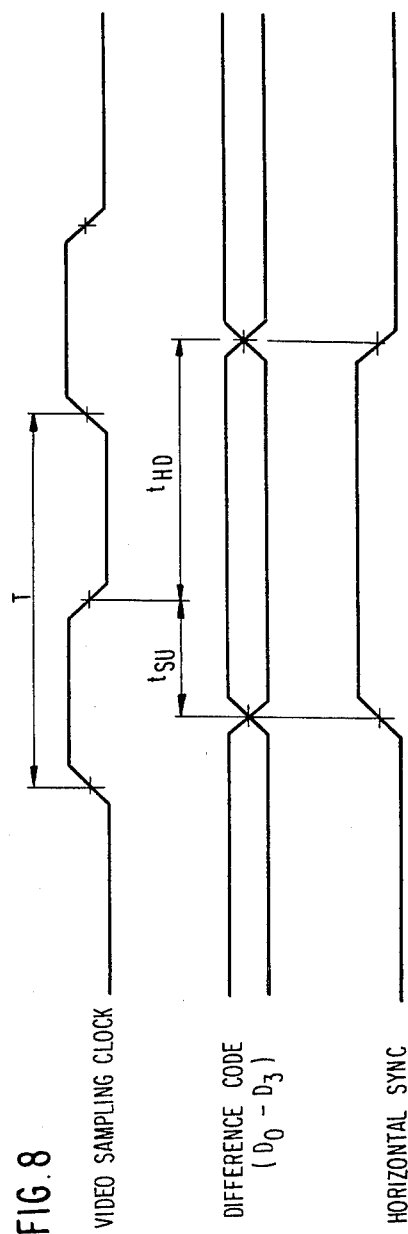
FIG. 8 is a timing diagram illustrating the timing relation between the video sampling clock, the DPCM encoded video and the horizontal sync.

FIGS. 4–7 show, in more detail, the sync detection and parity generation circuit 40 as well as the associated data multiplexer 20, audio data latch 50 and timing and control circuit 90. FIGS. 8–10 show relevant waveforms.

Referring now to FIG. 4, a latch 100 is subjected to 4-bit parallel video samples, and a horizontal sync pulse; the inputs are clocked via the video sampling clock. A timing diagram is shown in FIG. 8 relating the video sampling clock to the video difference code and horizontal sync. In a typical embodiment of the invention, the period T is 93.5 nanoseconds, the data setup time $t_{SU}$ is 30 nanoseconds minimum and the data hold time $t_{HD}$ is 30 nanoseconds minimum. Of course, FIG. 8, in indicating the timing of the horizontal sync pulse relative to the video sampling clock should not be taken as implying that a horizontal sync pulse is coincident with each video sampling clock, rather the horizontal sync pulse is produced at the beginning of each horizontal line scan.

After latching via the latch 100, the state of any video difference code and horizontal sync are shifted into the FIFO's 101 and 102 by the shift in clocks SIA and SIB. The latter two clocks are the video sampling clock divided in half via the flip-flop 103 (see FIG. 5). Since SIA and SIB are sequential, time sequential samples are stored in different FIFO's. It should be apparent that this use of two FIFO's is not essential to the invention.

The video difference samples and the horizontal sync pulse are shifted out of the FIFO's 101 and 102 by the shift out clocks SOA and SOB. Both these shift out clocks are 11.184 MHz burst rate derivatives of the T3 clock. The shift out clocks' derivation is shown in FIG.

5 and will be discussed hereinafter. Accordingly, the FIFO's 101, 102 provide the function of a buffer.

The output conductors of FIFO's 101 and 102 carry the video difference codes to the input of parity generator 104. The video difference codes, as read out from FIFO 101 or FIFO 102 are latched by the 11.184 MHz clock into a latch 105. The output of the latch 105 comprises a 4-bit wide tristate data bus (DB0–DB3) and the latch 105 is controlled by the signal DISABLE VIDEO or $\overline{\text{ENABLE VIDEO}}$/Enable Sync & Parity (which is abbreviated $\overline{\text{EV}}$/ES & P in FIG. 4). The production of both signals is described hereinafter.

Audio samples are latched into a latch 106 via a nibble clock also derived from the timing control 90. As shown in FIG. 3, the timing control 90 produces an audio sampling clock and an audio nibble clock; the timing is shown in FIG. 9. The sampled audio produces audio data; and as is shown in FIG. 9, the clocks provide for three 4-bit nibbles for each of two channels. The output of latch 106 is tristated onto the bus under control of the signal $\overline{\text{ENABLE AUDIO}}$. Since the signals DISABLE VIDEO and $\overline{\text{ENABLE AUDIO}}$ are mutually exclusive, only one of the latches 105 or 106 places an output on the tristate data bus at any one time.

Horizontal sync and parity is derived from the latch 107 which is clocked by the parity/sync clock, the production of which is shown in FIG. 5. The timing for the operation is shown in FIG. 10. The first two lines on FIG. 10 illustrate the 11.184 MHz derivative of the T3 clock and the second line illustrates one of the shift out clocks (SOA).

The third line of FIG. 10 shows horizontal sync read out of either FIFO 101 or FIFO 102. When present, this pulse is latched, by the parity/sync clock, into the hex "D" flip-flop 108. At the Q5 output, the rising edge of the signal clocks flip-flop 109 producing the SYNC DETECT pulse; which is shown in the fifth line in FIG. 10. SYNC DETECT/LATCH PARITY is used to latch and then reset (via flip-flops 111, 112), the parity on the difference code.

The opposite phase $\overline{\text{LATCH PARITY}}$ (output of the inverter 113) resets parity (flip-flop 111) and is latched by the 11 MHz clock (see FIG. 5) in flip-flop 116. The output of flip-flop 116 is STOP VIDEO, which is gated with the 11 MHz clock (gate 117) to stop the shift out clocks produced by flip-flop 118 is the absence of STOP VIDEO.

Returning to FIG. 4, the SYNC DETECT (LATCH PARITY) pulse is reclocked (in the zero stage) by the PARITY/SYNC CLOCK in the flip-flop 108 and the result, $\overline{\text{EV}}$/ES & P $\overline{\text{ENABLE VIDEO}}$/ENABLE SYNC AND PARITY) at the Q0 output (shown in line 6 of FIG. 10) is used to disable latch 105 and enable (via inverter 114) the output of the parity/sync latch 107. The output of latch 107 is tristated onto the common data bus (DB0–DB3).

Vertical sync is received at the multiplexer 110 to control its output. The output of multiplexer 110 is also controlled by the sync detect. When horizontal sync occurs, the outputs of the multiplexer 110 are all ones. Output YA remains high for three parity/sync clocks and then changes to the difference code parity.

As shown in FIG. 10, line 10 the sync detect results in $\overline{\text{EV}}$/ES & P after a short delay. $\overline{\text{EV}}$/ES & P is present for a total of four nibble times. During the first three nibble times, three 4-bit nibbles, each 1's, are output from latch 107. The multiplexer 110 output $Y_A$ provides a single bit for each nibble and $Y_B$ provides the other three bits for each nibble. At the last nibble time, another 4-bit nibble is again put on the bus, however the makeup of this depends on the condition of $S_1$. If $S_1$ is in a state indicating the presence of vertical sync, then the first three bits are all 1 and vice versa. The last bit is a parity bit from flip-flop 112.

Part of the timing and control is shown in FIG. 6. The T3 rate clock causes two counters 120 and 121 to count. The counters are arranged to divide the T3 rate clock by 85. One output produces the 11.184 MHz clock. The counters also produce a pulse, FRAME, which causes two additional counters 122 and 123 to count. These are arranged to divide the pulse FRAME by 56. The outputs of counters 122, 123 are the address lines of two 256 by 4 ROMs 124 which store multi-frame format data to generate necessary control signals. The output of the ROMs 124 is coupled to a hex flip-flop 125, one output of which is latched (by FRAME) into a flip-flop 126. The true output of flip-flop 126 is latched by an 11.184 MHz clock in a latch 127. DISABLE VIDEO and $\overline{\text{ENABLE AUDIO}}$ are the outputs of latch 127. DISABLE VIDEO disables the outputs of the video latch 105 and the parity/sync latch 107 when audio data is to be put on the data bus.

$\overline{\text{ENABLE AUDIO}}$ is used to enable the output of the audio latch 106 and stops the shift out clocks via gate 128 (FIG. 5).

By storing data in ROM 124 identifying the locations of the audio nibbles in the frame of FIG. 2, the output of flip-flop 127 can be controlled to disable the video and enable audio at the appropriate times in the frame.

The ROM 124 also stores other signals identifying other overhead locations in the frame. Specifically, the location of F, M, P, X, U and N (see FIG. 2) are stored in ROM 124. When read out of ROM 124, these are used to set two positions of the hex flip-flop 125 which produce the MUX select signals, also shown in FIG. 6.

By referring briefly to FIG. 5, it should be apparent that in the presence of $\overline{\text{LATCH PARITY}}$ or $\overline{\text{ENABLE AUDIO}}$, clocking of flip-flop 118 can be prevented via AND gate 117. Thus, under either of these circumstances, the shift out clocks SOA and SOB are inhibited, preventing the read out from FIFO 101 or 102. This operation provides a "gap" in the frame for the insertion or either audio or the digital code word represen-ting beginning of a video line scan. As shown in FIG. 10, line 5, $\overline{\text{LATCH PARITY}}$, when present inhibits the buffer reading operation for four nibble times (via gate 117).

FIG. 5 also illustrates generation of the signal FREQ CODE. This is a digital signal representing the video clock rate. The video sampling clock is used to clock a quad flip-flop 141 with its outputs of one stage connected to inputs of the succeeding stage; the video sampling clock is also used to clock flip-flop 142 via exclusive OR gate 145. Accordingly, the flip-flop 142 provides for dividing the video sampling clock in half. At every multiframe, the output of flip-flop 142 is latched in flip-flop 143; the multiframe start input at stage $D_0$ is output of stage Q1 to clock flip-flop 143. Every multiframe, the flip-flop 142 is reset via NAND gate 144. The frequency code output is a single bit indicating a relation between the video sampling clock and the multiframe start. By integrating the transmitted bit at the receiver, the video clock can be made to track the transmitter's video sampling clock since the T3 rate is identical at both transmitter and receiver. This single bit, from flip-flop 143 is actually inserted six times into each multiframe. Sending the same bit six times is not, of course, necessary.

The frequency code output of flip-flop 143 provides one input to the multiplexer 130 (FIG. 7), another input to the multiplexer 130 corresponds to parity information coupled from parity generator 133 through flip-flop 135. The control signals for multiplexer 130 are provided by MUX select, i.e. from hex flip-flop 125 (FIG. 6). Periodically, in the frame a $\overline{\text{LOAD SR}}$ pulse is produced via flip-flop 146. This is clocked with the T3 clock, and is set by the output of NAND gate 148, one of whose inputs is provided by the 4-bit counter 120, and the other of whose inputs is provided via NOR gate 147 from another output of the 4-bit counter 120. The $\overline{\text{LOAD SR}}$ signal is used to load shift register 131 (see FIG. 7). The information for this parallel loading of shift register 131 is provided by a buffer 132 which receives its input in turn from the 4-bit wide tristate data bus DB0–DB3. The inputs to the buffer 131 are coupled in parallel to the parity generator 133 to generate the parity information referred to above.

The shift register 131 can also be serially loaded from the multiplexer 130 in a manner well-known to those skilled in the art. The MUX SELECT signals select frequency code parity information, or fixed data from the other multiplexer inputs, for shifting through the multiplexer 130 to the shift register 131 and out on the line labelled SERIAL DATA. It should be apparent how the ROM data stores a frame plan to generate appropriate MUX select signals to produce insertion of the appropriate inputs into the multiframe.

Although not illustrated in FIG. 6, the ROM 124 is also addressed by alarm and stuffing information. An alarm signal is generated (by equipment not illustrated), and its presence (or absence) produces the MUX SELECT signals to insert bits indicating the presence (or absence) of an alarm condition. Likewise, by monitoring the filled status of the FIFO's 101, 102, the necessity for stuffing is determined. If stuffing is required, the signal disable video is inhibited. If stuffing is not required, the signal is not inhibited and instead the MUX SELECT provides a fixed bit pattern in the unused stuff opportunity. The stuffing requirement is also used via ROM 124 to generate the appropriate stuffing indicator bits in the same fashion.

From the foregoing, it should be apparent that the interface described herein provides for a standard T3 format in which the information bearing signals consist of 4-bit nibbles of DPCM video and 4-bit audio nibbles. Coincident with each horizontal sync pulse and/or vertical sync pulse, the clock reading out the 4-bit video DPCM nibbles is inhibited and a predetermined sequence (depending on whether or not horizontal or vertical sync is occurred) is inserted onto the data bus in place of a video nibble. In addition, at selected times in the frame, parity, frequency code information or other data is inserted in a predetermined format.

The multiplexer 20 (FIG. 3) which multiplexes, video samples, audio samples, sync digital codes and parity corresonds to the latches 105–107 and the attached tri-state bus DB0–DB3. On the other hand the multiplexer 30 which multiplexes the output of multiplexer 20 with frame and overhead bits corresponds to the multiplexer 130, shift register 131 and buffer 132 (all in FIG. 7). The use of the shift register allows concurrent multiplexing and serializes the input from the tri-state bus DB0–DB3.

We claim:

1. An interface for a video encoder arranged to output asynchronously DPCM encoded NTSC video and supplemental data in a T3 data format and rate for interfacing with encoded video sampled at an integer multiple of $f_{sc}$ where $f_{sc}$ is the color subcarrier frequency comprising:
   a buffer with DPCM encoded video and video sync inputs, means to write video and video sync into said buffer in response to a sampling clock;
   timing circuit control means responsive to a T3 rate clock for producing a data read clock at a submultiple of said T3 rate clock;
   coupling means for coupling the data clock to said buffer for reading out said buffer memory at said data read clock rate to produce a data stream;
   sync detection means responsive to a sync signal read from said buffer for inhibiting said coupling means for a predetermined time;
   supplemental data generator means with an output coupled to a data multiplexing means for generating supplemental data;
   data multiplexing means responsive to video data read from said buffer and to supplemental data from said supplemental data generator means for outputting said video data and supplemental data in time sequence;
   whereby detection of a sync signal inhibits reading of said buffer for said predetermined time allowing insertion of said supplemental data.

2. The apparatus of claim 1 in which said data multiplexing means is also responsive to a vertical sync pulse for outputting supplemental data uniquely representative of vertical sync.

3. The apparatus of claim 2 in which said multiplexing means comprises:
   a tristate data bus,
   first and second latches coupled thereto,
   a multiplexer with a first fixed input and coupled to said second latch, and
   control means responsive to said sync detection means for disabling said first latch and enabling said second latch in response to a sync pulse whereby said first fixed input to said multiplexer is coupled to said tristate data bus through said second latch.

4. The apparatus of claim 3 wherein said multiplexer includes a second fixed input and a control terminal coupled to a vertical sync input,
   whereby either said first or second fixed input is coupled to said tristate data bus depending on the presence or absence of said vertical sync pulse.

5. The apparatus of claim 1 which further includes:
   comparator means with two inputs and an output for comparing a first input rate directly related to $F_{sc}$ with a second input rate directly related to said T3 rate and for producing a frequency code signal, and wherein:
   said data multiplexing means includes a frequency code multiplexer responsive to said comparator means and said time sequence of video and supplemental data for inserting said frequency code signal into said time sequence.

6. A method of transmitting DPCM encoded NTSC video in a T3 format comprising the steps of:
   (a) creating a stream of said DPCM encoded NTSC video,
   (b) creating a parallel stream of horizontal sync pulses, (c) momentarily halting said stream of DPCM encoded NTSC video at the occurrence of each horizontal sync pulse, (d) inserting a predetermined bit pattern into said DPCM stream once for each horizontal sync pulse during said momentary halt, (e) inserting overhead bits into said stream corresponding to a standard T3 format, and (f) transmitting the resulting stream in a bit serial fashion.

7. The method of claim 6 which includes the further steps of:

(i) periodically, with reference to a T3 clock, halting said streams of steps (a) and (b), and (ii) inserting a digital word representing audio information into a stream produced as a result of step (c) for each halt of step (i).

8. The method of claim 6 which comprises the further steps of:

(i) continually comparing a rate directly related to a subcarrier of said NTSC video with a rate directly related to T3 rate to produce a frequency code signal, and (ii) inserting said frequency code signal into said stream in said step (e).

9. A method of transmitting DPCM encoded NTSC video in a T3 format comprising the steps of:

assembling a serial digital bit stream into sequential T3 frames, repeating at a T3 frame rate, said serial digital bit stream consisting of a sequence of 56 85-bit digital words, 28 odd and 28 even words, each such word including a single control bit and 84 data bits, a majority of said 84 data bits comprising encoded video, each such odd digital word including a single 4-bit nibble of substantially only digitized audio data, said digital bit stream associated with at least every other frame including a plurality of 4-bit nibbles signalling a video scan line start.

10. An interface for a video encoder arranged to output asynchronously encoded video and supplemental data in a T3 data format and rate for interfacing with DPCM encoded video sampled at an integer multiple of a color subcarrier comprising:

means for inserting DPCM encoded video into a T3 frame, first means for comparing a video sampling clock directly related to said color subcarrier and a T3 signal directly related to said T3 rate, and wherein said means for inserting includes:

means responsive to said first means for inserting data representative of said comparison into said T3 frame.

11. The interface of claim 10 wherein said first means includes:

a delay means responsive to said T3 signal and clocked by said video sampling clock, a counter clocked by said video sampling clock resetting means for resetting said counter in response to said delay means reaching a predetermined condition, a latch responsive to said counter and clocked each time said delay means reaches a different predetermined condition for supplying said data representative of said comparison.

12. The apparatus of claim 10 wherein said means for inserting includes:

buffer means responsive to sequentially presented video differences and to periodically presented horizontal sync pulses for storing the same, data read clock means responsive to said T3 rate for generating a data read clock, coupling means for coupling said data read clock to said buffer means for reading said buffer means, sync detection means responsive to said buffer means for inhibiting said coupling means for a predetermined time on detection of a sync pulse read from said buffer means, supplemental data generating means for generating supplemental data in response to said sync pulse from said buffer means, multiplexing means including a pair of latches, a first latch responsive to video differences read from said buffer means and a second responsive to said supplemental data for generating a time sequence of said video differences and said supplemental data, second multiplexing means responsive to said time sequence and to said data representative of said comparison for generating a composite time sequence.

* * * * *